(12) United States Patent
Yuan et al.

(10) Patent No.: US 11,945,335 B2
(45) Date of Patent: Apr. 2, 2024

(54) METHOD AND SYSTEM FOR CHARACTERIZING ENERGY CONSUMPTION INDICATOR OF ELECTRIC VEHICLE

(71) Applicant: Jilin University, Changchun (CN)

(72) Inventors: Xinmei Yuan, Changchun (CN); Bo Bao, Changchun (CN); Dongyu Zhang, Changchun (CN); Jingfei Jiang, Changchun (CN); Fanzhuo Meng, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 293 days.

(21) Appl. No.: 17/646,803

(22) Filed: Jan. 3, 2022

(65) Prior Publication Data
US 2023/0051503 A1 Feb. 16, 2023

(30) Foreign Application Priority Data

Aug. 6, 2021 (CN) .......................... 202110899709.X
Dec. 1, 2021 (CN) .......................... 202111457972.X

(51) Int. Cl.
*B60L 58/12* (2019.01)
*B60L 50/60* (2019.01)

(52) U.S. Cl.
CPC ............... *B60L 58/12* (2019.02); *B60L 50/60* (2019.02); *B60L 2240/12* (2013.01); *B60L 2240/54* (2013.01); *B60L 2240/62* (2013.01)

(58) Field of Classification Search
None
See application file for complete search history.

(56) References Cited

U.S. PATENT DOCUMENTS 8,239,127 B2 * 8/2012 Kono ................. G01C 21/3469
701/123

FOREIGN PATENT DOCUMENTS

| CN | 106596135 B | * | 9/2017 | |
|---|---|---|---|---|
| CN | 109684756 A | * | 4/2019 | |
| CN | 110646743 A | * | 1/2020 | ......... G01R 31/3648 |

OTHER PUBLICATIONS

Chen et al., "A Review and Outlook of Energy Consumption Estimation Models for Electric Vehicles", Mar. 28, 2020, SAE International Journal of Sustainable Transport (Year: 2020).*

(Continued)

*Primary Examiner* — Todd Melton
*Assistant Examiner* — Sarah A. Mueller
(74) *Attorney, Agent, or Firm* — Tutunjian & Bitetto, P.C.

(57) ABSTRACT

A method and system for characterizing an energy consumption indicator of an electric vehicle (EV) is provided. The method includes performing a cyclic energy consumption test on the EV to acquire a time-speed curve, a time-direct current (DC) energy consumption curve, and a total alternating current (AC) energy consumption in the test cycle. A DC energy consumption rate and an AC energy consumption rate of the EV is determined in each of test sub-cycles. A driving feature is determined in each of the test sub-cycles and a normalized driving feature is determined in each of the test sub-cycles according to the driving feature in each of the test sub-cycles and a base driving feature. A DC energy consumption indicator and an AC energy consumption indicator of the EV are extracted according to DC energy consumption rates, AC energy consumption rates and normalized driving features of the EV in all test sub-cycles.

6 Claims, 3 Drawing Sheets

(56) References Cited

OTHER PUBLICATIONS

Modi et al., "Estimation of energy consumption of electric vehicles using Deep Convolutional Neural Network to reduce driver's range anxiety", Aug. 24, 2020, ISA Transactions 98:454-470 (Year: 2020).*
Yi et al., "Sensitivity Analysis of Environmental Factors for Electric Vehicles Energy Consumption", Oct. 1, 2015, 2015 IEEE Vehicle Power and Propulsion Conference (Year: 2015).*
Ceraolo et al., "Microcycle-based efficiency of hybrid vehicle batteries", Jan. 1, 2005, 2005 IEEE Vehicle Power and Propulsion Conference (Year: 2005).*
Machine translation of Yuan et al. (CN 106596135 B) (Year: 2024).*

* cited by examiner

METHOD AND SYSTEM FOR CHARACTERIZING ENERGY CONSUMPTION INDICATOR OF ELECTRIC VEHICLE

TECHNICAL FIELD

The present disclosure relates to the field of energy consumption indicator extraction, and in particular, to a method and system for characterizing an energy consumption indicator of an electric vehicle (EV).

BACKGROUND ART

With the rapid development of EV industry in recent years, the global EV ownership surpassed 10 million by 2020. Not only are consumers eager to know accurate energy consumptions of EVs to make reasonable evaluations on economy of different vehicle models in use, but governments and various research institutes also need to know energy consumptions of EVs to properly determine energy-conserving and environmental benefits of the EVs. At present, results derived from standard test cycles according to national standards like the China Light-Duty Vehicle Test Cycle (CLTC), European standards like the Worldwide Harmonized Light Vehicle Test Cycle (WLTC) and so on are considered as solely credible to describe the energy consumptions of the EVs. As these test results are only energy consumption rates of the EVs in corresponding standard cycles, they are not suitable for other cycles obviously, nor make the individual consumers know what differences are between their driving features and the standard test results; and a number of studies also raise the question to these representative results. However, existing schemes for addressing differences between the test results and the real-world driving are often achieved by simply modifying the results based on experience. Concerning the energy consumption test, attempts are being made to introduce multiple test cycles (such as five-cycle testing developed by the Environmental Protection Agency (EPA)) into the standard test, so as to expand the coverage of the test results. But due to time limitations, there cannot be too many standard test cycles. Hence, the accurate characterization for energy consumption levels of the EVs in any cycle is still hardly achieved, and is always the bottleneck in the EV industry.

For the energy consumption test of the vehicles, schemes including the Chinese patent application 201611246090.8 entitled Method for Testing, Evaluating and Predicting Real-World Driving Energy Consumption of Purely Electric Vehicle (patent 1), the Chinese patent application 202011542380.3 entitled Method and Apparatus for Predicting Travel Energy Consumption of Electric Vehicle, Device and Storage Medium (patent 2), and the literature 1: X. Yuan*, C. Zhang, G. Hong, X. Huang, and L. Li, "Method for Evaluating the Real-World Driving Energy Consumptions of Electric Vehicles", Energy, vol. 141, pp. 1955-1968, 2017 have been disclosed. The patent 1, patent 2 and literature 1 are all directed to the real-world driving and unavailable to select the reasonable test cycles; and moreover, since samples in real-world driving cycles are affected by many random factors, samples of sufficient size and coverage only ensure the results to be relatively accurate. More importantly, due to the large randomness of the samples in real-world driving, the results derived from the above schemes are hardly standardized.

Therefore, in order to achieve the standard evaluation on energy consumptions of the EVs, it is desirable to provide a standard method or system for extracting an energy consumption indicator of the EV for all cycles.

SUMMARY

An objective of the present disclosure is to provide a method and system for characterizing an energy consumption indicator of an EV The present disclosure can extract energy consumption indicators of the EV for any cycle, and make a standard, comprehensive and accurate evaluation on energy consumption levels of the EV for different cycles.

To implement the above objectives, the present disclosure provides the following solutions.

A method for characterizing an energy consumption indicator of an EV includes generating a test cycle, multiple test sub-cycles being assigned to different state of charge (SOC) phases of the test cycle.

A cyclic energy consumption test is performed on the EV according to a generated test cycle until a termination condition for the energy consumption test of the EV is met, and acquiring a time-speed curve, a time-direct current (DC) energy consumption curve, and a total alternating current (AC) energy consumption in the test cycle during the test.

A DC energy consumption rate and an AC energy consumption rate of the EV is determined in each of the test sub-cycles according to a result of the cyclic energy consumption test.

A driving feature is determined in each of the test sub-cycles according to the time-speed curve in the test cycle, the driving feature including: a speed intensity, a braking intensity and a slow-driving intensity.

A normalized driving feature is determined in each of the test sub-cycles according to the driving feature in each of the test sub-cycles and a base driving feature, the base driving feature being a driving feature in a base cycle, and a DC energy consumption indicator and an AC energy consumption indicator of the EV are extracted according to DC energy consumption rates, AC energy consumption rates and normalized driving features of the EV in all test sub-cycles, the DC energy consumption indicator including: a DC energy consumption base, a DC energy consumption speed sensitivity, a DC energy consumption braking sensitivity and a DC energy consumption slow-driving sensitivity; and the AC energy consumption indicator including: an AC energy consumption base, an AC energy consumption speed sensitivity, an AC energy consumption braking sensitivity and an AC energy consumption slow-driving sensitivity.

Optionally, the determining a DC energy consumption rate and an AC energy consumption rate of the EV in each of the test sub-cycles according to a result of the cyclic energy consumption test may specifically include:

determining a test distance of the EV in a jth test sub-cycle according to an equation $d_j = \sum_{i=1}^{N_j-1} t_s (v_j(i)+v_j(i+1))/2$;

determining a DC energy consumption rate of the EV in the jth test sub-cycle according to an equation $c_{DC,j} = E_{DC,j}/d_j$; and determining an AC energy consumption rate of the EV in the jth test sub-cycle according to an equation $$c_{AC,j} = \frac{E_{AC}}{\sum_{j=1}^{N} E_{DC,j}} c_{DC,j}$$

where, $d_j$ is the test distance of the EV in the jth test sub-cycle, $N_j$ is a total number of samples in the jth test sub-cycle, $v_j(i)$ is a driving speed sequence of the EV in the jth test sub-cycle, i=1 ... $N_j$, $t_s$ is a sampling interval, $C_{DC,j}$ is the DC energy consumption rate of the EV in the jth test sub-cycle, $E_{DC,j}$ is a DC energy consumption of the EV in the jth test sub-cycle, $E_{AC}$ is a total AC energy consumption in the test cycle, and $C_{AC,j}$ is the AC energy consumption rate of the EV in the jth test sub-cycle.

Optionally, the determining a driving feature in each of the test sub-cycles according to the time-speed curve in the test cycle may specifically include:

determining a speed intensity in the jth test sub-cycle according to an equation $I_{spd,j}=$ $$\frac{\sum_{i=1}^{N_j}(v_j(i))^3}{\sum_{i=1}^{N_j}v_j(i)};$$

determining a braking intensity in the jth test sub-cycle according to an equation $$I_{brk,j}=\frac{\sum_{i=1}^{N_j}\max\left((v_j(i))^2-(v_j(i+1))^2,0\right)}{\sum_{i=1}^{N_j}v_j(i)};$$

and determining a slow-driving intensity in the jth test sub-cycle according to an equation $$I_{slw,j}=\frac{1}{\sum_{i=1}^{N_j}v_j(i)},$$

where, $I_{spd,j}$ is the speed intensity in the jth test sub-cycle, $I_{brk,j}$ is the braking intensity in the jth test sub-cycle, and $I_{slw,j}$ is the slow-driving intensity in the jth test sub-cycle.

Optionally, the determining a normalized driving feature in each of the test sub-cycles according to the driving feature in each of the test sub-cycles and a base driving feature may specifically include:

determining a normalized speed intensity according to an equation $$I'_{spd}=\frac{I_{spd}}{I_{spd}^{base}};$$

determining a normalized braking intensity according to an equation $$I'_{brk}=\frac{I_{brk}}{I_{brk}^{base}};$$

and determining a normalized slow-driving intensity according to an equation $$I'_{slw}=\frac{I_{slw}}{I_{slw}^{base}},$$

where, $I_{spd}^{base}$ is a base speed intensity, $I_{brk}^{base}$ is a base braking intensity, $I_{slw}^{base}$ is a base slow-driving intensity, $I'_{spd}$ is the normalized speed intensity, $I'_{brk}$ is the normalized braking intensity, $I'_{slw}$ is the normalized slow-driving intensity, $I_{spd}$ is the speed intensity, $I_{brk}$ is the braking intensity, and $I_{slw}$ is the slow-driving intensity.

Optionally, the extracting a DC energy consumption indicator and an AC energy consumption indicator of the EV according to DC energy consumption rates, AC energy consumption rates and normalized driving features of the EV in all test sub-cycles may specifically include:

extracting the DC energy consumption indicator of the EV according to an equation $c_{DC,j}=c_{DC}^0+c_{DC}^{spd}I'_{spd,j}+c_{DC}^{brk}I'_{brk,j}+c_{DC}^{slw}I'_{slw,j}$ by using a fitting method; and extracting the AC energy consumption indicator of the EV according to an equation $c_{AC,j}=c_{AC}^0+c_{AC}^{spd}I'_{spd,j}+c_{AC}^{brk}I'_{brk,j}+c_{AC}^{slw}I'_{slw,j}$ by using the fitting method, where, $c_{DC}^0$ is the DC energy consumption base, $c_{DC}^{spd}$ is the DC energy consumption speed sensitivity, $c_{DC}^{brk}$ is the DC energy consumption braking sensitivity, $c_{DC}^{slw}$ is the DC energy consumption slow-driving sensitivity, $c_{AC}^0$ is the AC energy consumption base, $c_{AC}^{spd}$ is the AC energy consumption speed sensitivity, $c_{AC}^{brk}$ is the AC energy consumption braking sensitivity, $c_{AC}^{slw}$ is the AC energy consumption slow-driving sensitivity, $I'_{spd,j}$ is a normalized speed intensity in the jth test sub-cycle, $I'^{brk,j}$ is a normalized braking intensity in the jth test sub-cycle, and $I'_{slw,j}$ is a normalized slow-driving intensity in the jth test sub-cycle.

Optionally, the extracting a DC energy consumption indicator and an AC energy consumption indicator of the EV according to DC energy consumption rates, AC energy consumption rates and corresponding normalized driving features of the EV in all test sub-cycles may specifically further include:

adding a constraint according to equations $c_{DC}^{base}=c_{DC}^0+c_{DC}^{spd}+c_{DC}^{brk}+c_{DC}^{slw}$ and $c_{AC}^{base}=c_{AC}^0+c_{AC}^{spd}+c_{AC}^{brk}+c_{AC}^{slw}$, where, case is a $c_{DC}^{base}$ energy consumption rate in the base cycle, and $c_{AC}^{base}$ is an AC energy consumption rate in the base cycle.

A system for characterizing an energy consumption indicator of an electric vehicle includes a test cycle generation module, a cyclic energy consumption test module, an energy consumption rate determination module, a driving feature determination module, a normalized driving feature module and an energy consumption indicator extraction module.

The test cycle generation module is configured to generate a test cycle, multiple test sub-cycles being assigned to different SOC phases of the test cycle.

The cyclic energy consumption test module is configured to perform a cyclic energy consumption test on the EV according to a generated test cycle until a termination condition for the energy consumption test of the EV is met, and acquire a time-speed curve, a time-DC energy consumption curve, and a total AC energy consumption in the test cycle during the test.

The energy consumption rate determination module is configured to determine a DC energy consumption rate and an AC energy consumption rate of the EV in each of the test sub-cycles according to a result of the cyclic energy consumption test.

The driving feature determination module is configured to determine a driving feature in each of the test sub-cycles according to the time-speed curve in the test cycle, the driving feature including: a speed intensity, a braking intensity and a slow-driving intensity.

The normalized driving feature determination module is configured to determine a normalized driving feature in each of the test sub-cycles according to the driving feature in each of the test sub-cycles and a base driving feature, the base driving feature being a driving feature in a base cycle.

The energy consumption indicator extraction module is configured to extract a DC energy consumption indicator and an AC energy consumption indicator of the EV according to DC energy consumption rates, AC energy consumption rates and normalized driving features of the EV in all test sub-cycles, the DC energy consumption indicator including: a DC energy consumption base, a DC energy consumption speed sensitivity, a DC energy consumption braking sensitivity and a DC energy consumption slow-driving sensitivity; and the AC energy consumption indicator including: an AC energy consumption base, an AC energy consumption speed sensitivity, an AC energy consumption braking sensitivity and an AC energy consumption slow-driving sensitivity.

Optionally, the energy consumption rate determination module may specifically include:
  a test distance determination unit, configured to determine a test distance of the EV in a jth test sub-cycle according to an equation $d_j = \sum_{i=1}^{N_j-1} t_s (v_j(i)+v_j(i+1))/2$;
  a DC energy consumption rate determination unit, configured to determine a DC energy consumption rate of the EV in the jth test sub-cycle according to an equation $c_{DC,j} = E_{DC,j}/d_j$; and
  an AC energy consumption rate determination unit, configured to determine an AC energy consumption rate of the EV in the jth test sub-cycle according to an equation $$c_{AC,j} = \frac{E_{AC}}{\sum_{j=1}^{N} E_{DC,j}} c_{DC,j}$$

where, $d_j$ is the test distance of the EV in the jth test sub-cycle, $N_j$ is a total number of samples in the jth test sub-cycle, $v_j(i)$ is a driving speed sequence of the EV in the jth test sub-cycle, $i = 1 \ldots N_j$, $t_s$ is a sampling interval, $C_{DC,j}$ is the DC energy consumption rate of the EV in the jth test sub-cycle, $E_{DC,j}$ is a DC energy consumption of the EV in the jth test sub-cycle, $E_{AC}$ is a total AC energy consumption in the test cycle, and $C_{AC,j}$ is the AC energy consumption rate of the EV in the jth test sub-cycle.

Optionally, the driving feature determination module may specifically include:
  a speed intensity determination unit, configured to determine a speed intensity in the jth test sub-cycle according to an equation $$I_{spd,j} = \frac{\sum_{i=1}^{N_j} (v_j(i))^3}{\sum_{i=1}^{N_j} v_j(i)};$$

a braking intensity determination unit, configured to determine a braking intensity in the jth test sub-cycle according to an equation $$I_{brk,j} = \frac{\sum_{i=1}^{N_j} \max\left((v_j(i))^2 - (v_j(i+1))^2, 0\right)}{\sum_{i=1}^{N_j} v_j(i)};$$

and
  a slow-driving intensity determination unit, configured to determine a slow-driving intensity in the jth test sub-cycle according to an equation $$I_{slw,j} = \frac{1}{\sum_{i=1}^{N_j} v_j(i)},$$

where, $I_{spd,j}$ is the speed intensity in the jth test sub-cycle, $I_{brk,j}$ is the braking intensity in the jth test sub-cycle, and $I_{slw,j}$ is the slow-driving intensity in the jth test sub-cycle.

Optionally, the normalized driving feature determination module may specifically include:
  a normalized speed intensity determination unit, configured to determine a normalized speed intensity according to an equation $$I'_{spd} = \frac{I_{spd}}{I_{spd}^{base}};$$

a normalized braking intensity determination unit, configured to determine a normalized braking intensity according to an equation $$I'_{brk} = \frac{I_{brk}}{I_{brk}^{base}};$$

and
  a normalized slow-driving intensity determination unit, configured to determine a normalized slow-driving intensity according to an equation $$I'_{slw} = \frac{I_{slw}}{I_{slw}^{base}},$$

where, $I_{spd}^{base}$ is a base speed intensity, $I_{brk}^{base}$ is a base braking intensity, and $I_{slw}^{base}$ is a base slow-driving intensity.

Optionally, the energy consumption indicator extraction module may specifically include:
  a DC energy consumption indicator extraction unit, configured to extract the DC energy consumption indicator of the EV according to an equation $c_{DC,j} = c_{DC}^{0} + c_{DC}^{spd} I'_{spd,j} + c_{DC}^{brk} I'_{brk,j} + c_{DC}^{slw} I'_{slw,j}$ by using a fitting method; and
  an AC energy consumption indicator extraction unit, configured to extract the AC energy consumption indicator of the EV according to an equation $c_{AC,j} = c_{AC}^{0} + c_{AC}^{spd} I'_{spd,j} + c_{AC}^{brk} I'_{brk,j} + c_{AC}^{slw} I'_{slw,j}$ by using the fitting method,
  where, $c_{DC}^{0}$ is the DC energy consumption base, $c_{DC}^{spd}$ is the DC energy consumption speed sensitivity, $c_{DC}^{brk}$ is the DC energy consumption braking sensitivity, $c_{DC}^{slw}$ is the DC energy consumption slow-driving sensitivity, $c_{AC}^{0}$ is the AC energy consumption base, $c_{AC}^{spd}$ is the AC energy consumption speed sensitivity, $c_{AC}^{brk}$ is the AC energy consumption braking sensitivity, $c_{AC}^{slw}$ is the AC energy consumption slow-driving sensitivity, $I'_{spd,j}$ is a normalized speed intensity in the jth test sub-cycle, $I'_{brk,j}$ is a normalized braking intensity in the jth test sub-cycle, and $I'_{slw,j}$ is a normalized slow-driving intensity in the jth test sub-cycle.

Based on specific embodiments provided in the present disclosure, the present disclosure discloses the following technical effects:

Through generation of the test cycle and reasonable data analysis, the method and system for characterizing an energy consumption indicator of an EV provided by the present disclosure acquire explainable energy consumption indicators for all cycles without increasing the test workload. With the use of the acquired energy consumption indicators, namely, the energy consumption base, the energy consumption speed sensitivity, the energy consumption braking sensitivity, and the energy consumption slow-driving sensitivity, the present disclosure can clearly characterize differences of specific vehicle models in energy consumption rate for different cycles, and can conveniently evaluate the energy consumptions of the EV in different traffic conditions and speed cycles, thereby effectively solving the problem of standard description and evaluation on the energy consumption indicators of the EV for all cycles.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following descriptions show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by the person of ordinary skill in the art on the basis of the embodiments of the present disclosure without creative efforts shall fall within the protection scope of the present disclosure.

An objective of the present disclosure is to provide a method and system for characterizing an energy consumption indicator of an EV The present disclosure can extract energy consumption indicators of the EV for any cycle, and provide standard, comprehensive and accurate energy consumption levels of the EV for different cycles.

To make the above objectives, features, and advantages of the present disclosure clearer and more comprehensible, the present disclosure will be further described in detail below with reference to the accompanying drawings and the specific embodiments.

Figure 1:
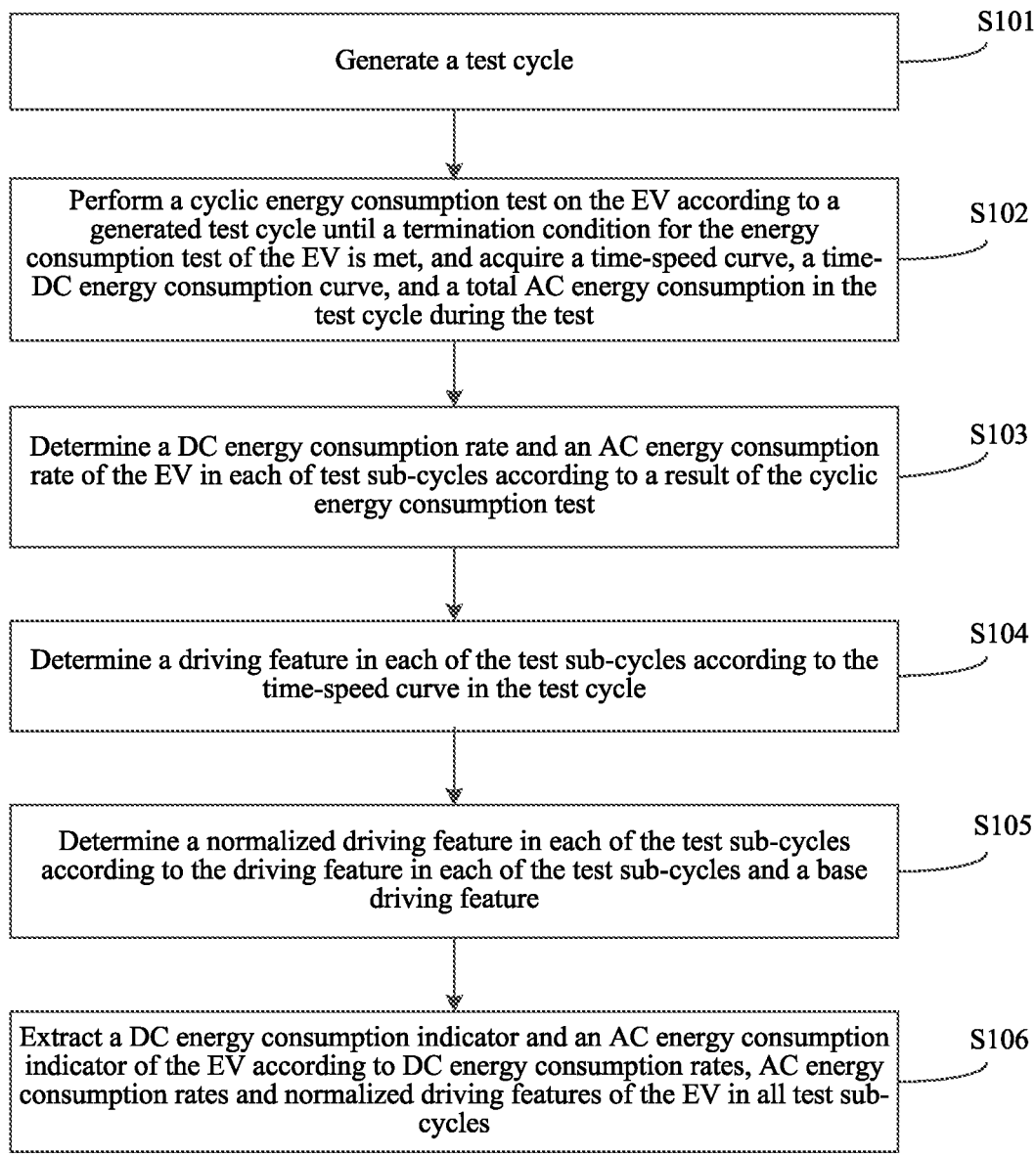
FIG. 1 is a flow chart of a method for characterizing an energy consumption indicator of an EV according to the present disclosure.

FIG. 1 is a flow chart of a method for characterizing an energy consumption indicator of an EV according to the present disclosure. As shown in FIG. 1, the method for characterizing an energy consumption indicator of an EV includes the following steps:

S101: Generate a test cycle. Multiple test sub-cycles are assigned to different SOC phases of the test cycle. The test sub-cycles can also be divided into a first class of test sub-cycles and a second class of test sub-cycles according to their classes, though limits are not made thereto. The first class of test sub-cycles are generally called comprehensive standard cycles in which the vehicle speed changes complicatedly, and both the start speed and the end speed are 0. The second class of test sub-cycles are those with a constant speed.

Figure 2:
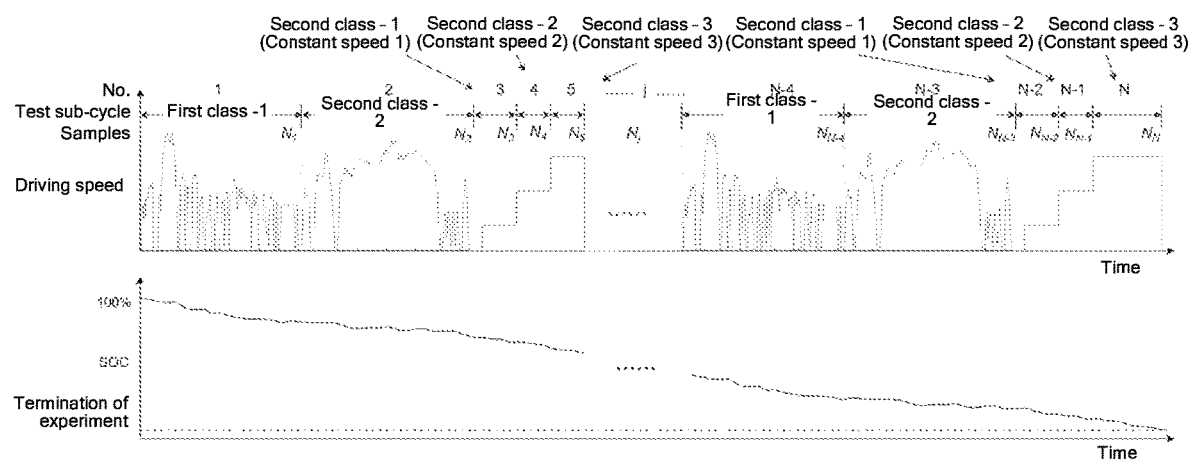
FIG. 2 is a schematic view for generating a test cycle.

As shown in FIG. 2, the test cycle is composed of N spliced test sub-cycles. There are two classes of test sub-cycles. The first class of test sub-cycles, generally called the comprehensive standard cycles, are stipulated by countries and regions based on a large amount of statistical data and are representative of local speed features during vehicle driving. For example, the standard cycles are stipulated according to the China light-duty vehicle test cycle for passenger car (CLTC-P), European WLTC, American Urban Dynamometer Driving Schedule (UDDS), Highway Fuel Economy Test (HWYFET), US06 Supplemental Federal Test Procedure (SFTP) and so on. The second class of test sub-cycles are those with the constant speed, such as the test cycle having the constant speed of 60 km/h or 80 km/h. According to the driving distance or the initial test, the number of standard cycles that a fully charged vehicle can drive is roughly estimated; and then the two classes of standard cycles are assigned to different SOC phases of the test cycle.

The first class of test sub-cycles include ≥1 test cycle, while the second class of test sub-cycles (the cycles with the constant speed) include ≥3 test cycles. It is proposed that the low speed, the medium speed and the high speed are respectively used as the constant speed. Upon the selection of the cycles, the test sub-cycles in the test cycle are arranged in a manner that all cycles are circulated for ≥2 times, until the vehicle passes through the high-speed cycle and runs continuously to reach the battery termination condition (refer to provisions on the shortening method in the energy consumption test regulations).

S102: Perform a cyclic energy consumption test on the EV according to a generated test cycle until a termination condition for the energy consumption test of the EV is met, and acquire a time-speed curve, a time-DC energy consumption curve, and a total AC energy consumption for the test cycle during the test. As a specific embodiment, the test process is implemented by a chassis dynamometer; and the DC energy consumption can be tested by a power analyzer or other devices. For the detailed energy consumption test requirements, see specific standards of various countries (such as GB/T 18386 and SAE J1634).

S103: Determine a DC energy consumption rate and an AC energy consumption rate of the EV for each of the test sub-cycles according to a result of the cyclic energy consumption test.

S103 specifically includes:

Determine a test distance of the EV in a jth test sub-cycle according to an equation $d_j = \sum_{i=1}^{N_j-1} t_s (v_j(i)+v_j(i+1))/2$.

Determine a DC energy consumption rate of the EV in the jth test sub-cycle according to an equation $c_{DC,j} = E_{DC,j}/d_j$.

Determine an AC energy consumption rate of the EV in the jth test sub-cycle according to an equation $$c_{AC,j} = \frac{E_{AC}}{\sum_{j=1}^{N} E_{DC,j}} c_{DC,j}.$$

In the foregoing equations, $d_j$ is the test distance of the EV in the jth test sub-cycle, $N_j$ is a total number of samples in the jth test sub-cycle, $v_j(i)$ is a driving speed sequence of the EV in the jth test sub-cycle, $i=1 \ldots N_j$, $t_s$ is a sampling interval, $C_{DC,j}$ is the DC energy consumption rate of the EV in the jth test sub-cycle, $E_{DC,j}$ is a DC energy consumption of the EV in the jth test sub-cycle, $E_{AC}$ is a total AC energy consumption in the test cycle, and $C_{AC,j}$ is the AC energy consumption rate of the EV in the jth test sub-cycle.

S104: Determine a driving feature for each of the test sub-cycles according to the time-speed curve in the test cycle. The driving feature includes: a speed intensity, a braking intensity and a slow-driving intensity.

S104 specifically includes:

Determine a speed intensity in the jth test sub-cycle according to an equation $$I_{spd,j} = \frac{\sum_{i=1}^{N_j} (v_j(i))^3}{\sum_{i=1}^{N_j} v_j(i)}.$$

Determine a braking intensity in the jth test sub-cycle according to an equation $$I_{brk,j} = \frac{\sum_{i=1}^{N_j} \max\left((v_j(i))^2 - (v_j(i+1))^2, 0\right)}{\sum_{i=1}^{N_j} v_j(i)}.$$

Determine a slow-driving intensity in the jth test sub-cycle according to an equation $$I_{slw,j} = \frac{1}{\sum_{i=1}^{N_j} v_j(i)}.$$

In the foregoing equations, $I_{spd,j}$ is the speed intensity in the jth test sub-cycle, $I_{brk,j}$ is the braking intensity in the jth test sub-cycle, and $I_{slw,j}$ is the slow-driving intensity in the jth test sub-cycle.

S105: Determine a normalized driving feature in each of the test sub-cycles according to the driving feature in each of the test sub-cycles and a base driving feature. The base driving feature is a driving feature in a base cycle. It is proposed that the urban comprehensive cycle under the current laws and standards is used as the base cycle. The normalized driving feature is a relative variable without the unit, and can clearly characterize differences of any cycle relative to the base cycle.

S105 specifically includes:

Determine a normalized speed intensity according to an equation $$I'_{spd} = \frac{I_{spd}}{I_{spd}^{base}}.$$

Determine a normalized braking intensity according to an equation $$I'_{brk} = \frac{I_{brk}}{I_{brk}^{base}}.$$

Determine a normalized slow-driving intensity according to an equation $$I'_{slw} = \frac{I_{slw}}{I_{slw}^{base}}.$$

In the foregoing equations, $I_{spd}^{base}$ is a base speed intensity, $I_{brk}^{base}$ is a base braking intensity, and $I_{slw}^{base}$ is a base slow-driving intensity.

S106: Extract a DC energy consumption indicator and an AC energy consumption indicator of the EV according to DC energy consumption rates, AC energy consumption rates and normalized driving features of the EV in all test sub-cycles. The DC energy consumption indicator includes: a DC energy consumption base, a DC energy consumption speed sensitivity, a DC energy consumption braking sensitivity and a DC energy consumption slow-driving sensitivity. The AC energy consumption indicator includes: an AC energy consumption base, an AC energy consumption speed sensitivity, an AC energy consumption braking sensitivity and an AC energy consumption slow-driving sensitivity.

S106 specifically includes:

Extract the DC energy consumption indicator of the EV according to an equation $c_{DC,j}=c_{DC}^{0}+c_{DC}^{spd}I'_{spd,j}+c_{DC}^{brk}I'_{brk,j}+c_{DC}^{slw}I'_{slw,j}$ by using a fitting method.

Extract the AC energy consumption indicator of the EV according to an equation $c_{AC,j}=c_{AC}^{0}+c_{AC}^{spd}I'_{spd,j}+c_{AC}^{brk}I'_{brk,j}+c_{AC}^{slw}I'_{slw,j}$ by using the fitting method.

In the foregoing equations, $c_{DC}^{0}$ is the DC energy consumption base, $c_{DC}^{spd}$ is the DC energy consumption speed sensitivity, $c_{DC}^{brk}$ is the DC energy consumption braking sensitivity, $c_{DC}^{slw}$ is the DC energy consumption slow-driving sensitivity, $c_{AC}^{0}$ is the AC energy consumption base, $c_{AC}^{spd}$ is the AC energy consumption speed sensitivity, $c_{AC}^{brk}$ is the AC energy consumption braking sensitivity, $c_{AC}^{slw}$ is the AC energy consumption slow-driving sensitivity, $I'_{spd,j}$ is a normalized speed intensity in the jth test sub-cycle, $I'_{brk,j}$ is a normalized braking intensity in the jth test sub-cycle, and $I'_{slw,j}$ is a normalized slow-driving intensity in the jth test sub-cycle.

In order to ensure that the extracted energy consumption indicators are strictly consistent with the test results in standard cycles, and that the method achieves results strictly consistent with those of the existing standard energy consumption test method, a constraint condition is added during fitting:

$$c_{DC}^{base}=c_{DC}^{0}+c_{DC}^{spd}+c_{DC}^{brk}+c_{DC}^{slw} \text{ and}$$
$$c_{AC}^{base}=c_{AC}^{0}+c_{AC}^{spd}+c_{AC}^{brk}+c_{AC}^{slw}.$$

In the foregoing equations, $c_{DC}^{base}$ is a DC energy consumption rate in the base cycle, and $c_{AC}^{base}$ is an AC energy consumption rate in the base cycle.

All extracted energy consumption indicators have a unit of Wh/km, and is applied to any cycle. In combination with the normalized speed intensity, the normalized braking intensity and the normalized slow-driving intensity, the method can directly exhibit changes of energy consumption rates of the vehicle in different cycles for the user.

The present disclosure provides the cycle generation method oriented to the laboratory test. Through one set test, the present disclosure can quickly acquire energy consumption indicators for all cycles. The present disclosure measures the AC and DC energy consumptions at the same time with laboratory conditions. Therefore, by adding the method for converting the AC and DC energy consumptions, the present disclosure can extract AC and DC energy consumption indicators of the EV at the same time. The introduction of the DC energy consumption is also favorable to save the test time and the sample size. The present disclosure introduces the base cycle to acquire the normalized speed intensity, the normalized braking intensity and the normalized slow-driving intensity, making the energy consumption indicators comprehensible. The energy consumption indicators can be intuitively understood as influences of differences of the speed, braking and slow-driving from the base cycle on the energy consumption rates, and this definition is useful for standardization and promotion of the energy consumption indicators for all cycles, and also improves the stability of the indicator extraction algorithm. The present disclosure introduces the concepts of the "slow-driving intensity" and "slow-driving energy consumption sensitivity", thereby extracting and describing the energy consumption indicators of the EV more accurately. The present disclosure can leverage existing standard test procedures in the laboratory condition, and quickly extract sufficient and explainable energy consumption indicators for all cycles only through one test cycle. Therefore, the present disclosure is applied to improving the standard energy consumption test and generalizing the standard test results to all cycles, thereby providing comprehensive, accurate and standard energy consumption information of the EV for more application scenarios.

The features of the present disclosure will be described below with examples:

The tested energy consumption rates of a vehicle in the CLTC-P standard cycle are as follows:

The AC energy consumption rate is 120 Wh/km, while the DC energy consumption rate is 107 Wh/km.

The above results are derived from the existing standard energy consumption test.

According to the simplest method in the present disclosure, the generated test cycle is as follows:

CLTC-P+constant speed 20 km/h+constant speed 50 km/h+constant speed 80 km/h+constant speed 110 km/h+ CLTC-P+ . . . until the termination condition of the test is met. The present disclosure can obtain the energy consumption indicators in Table 1:

TABLE 1

| Name of the energy consumption indicator | Energy consumption base | Energy consumption speed sensitivity | Energy consumption braking sensitivity | Energy consumption slow-driving sensitivity |
|---|---|---|---|---|
| DC energy consumption indicator | 58.5Wh/km | 24.7 Wh/km | 16.2 Wh/km | 7.7 Wh/km |
| AC energy consumption indicator | 65.6Wh/km | 27.6 Wh/km | 18.1 Wh/km | 8.6 Wh/km |

Compared with the existing standard test results, Table 1 clearly exhibits how the energy consumption rates change when features differ from those in the standard test cycle, namely the present disclosure is more favorable to generalize the energy consumption test results and characterize the energy consumption levels of the EV for all cycles than the conventional test.

Figure 3:
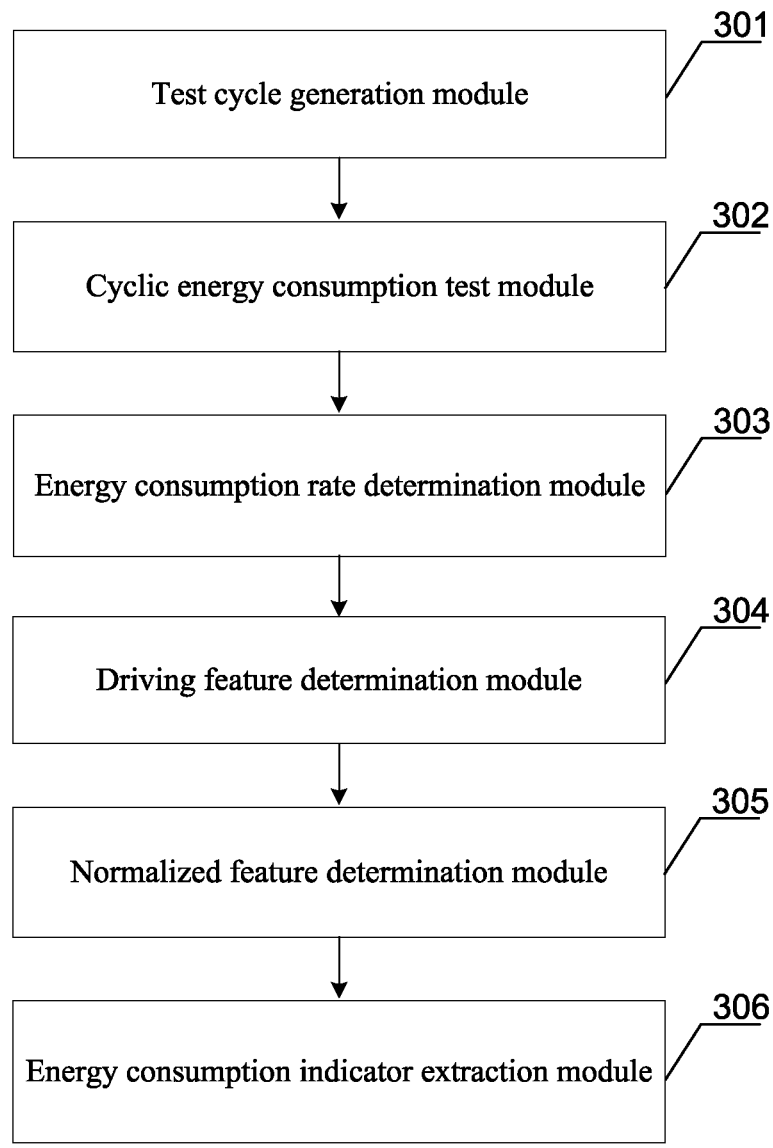
FIG. 3 is a schematic structural view of a system for characterizing an energy consumption indicator of an EV according to the present disclosure.

FIG. 3 is a schematic structural view of a system for characterizing an energy consumption indicator of an EV according to the present disclosure. As shown in FIG. 3, the system for characterizing an energy consumption indicator of an EV includes a test cycle generation module 301, a cyclic energy consumption test module 302, an energy consumption rate determination module 303, a driving feature determination module 304, a normalized driving feature determination module 305, and an energy consumption indicator extraction module 306.

The test cycle generation module 301 is configured to generate a test cycle. Multiple first classes of test sub-cycles and multiple second classes of test sub-cycles are assigned to different SOC phases of the test cycle. The first class of test sub-cycles are generally called comprehensive standard cycles in which the vehicle speed changes complicatedly, and both the start speed and the end speed are 0. The second class of test sub-cycles are those with a constant speed.

The cyclic energy consumption test module 302 is configured to perform a cyclic energy consumption test on the EV according to a generated test cycle until a termination condition for the energy consumption test of the EV is met, and acquire a time-speed curve, a time-DC energy consumption curve, and a total AC energy consumption in the test cycle during the test.

The energy consumption rate determination module 303 is configured to determine a DC energy consumption rate and an AC energy consumption rate of the EV in each of the test sub-cycles according to a result of the cyclic energy consumption test.

The driving feature determination module 304 is configured to determine a driving feature in each of the test sub-cycles according to the time-speed curve in the test cycle. The driving feature includes: a speed intensity, a braking intensity and a slow-driving intensity.

The normalized driving feature determination module 305 is configured to determine a normalized driving feature in each of the test sub-cycles according to the driving feature in each of the test sub-cycles and a base driving feature. The base driving feature is a driving feature in a base cycle. It is proposed that the urban comprehensive cycle under the current laws and standards is used as the base cycle.

The energy consumption indicator extraction module 306 is configured to extract a DC energy consumption indicator and an AC energy consumption indicator of the EV according to DC energy consumption rates, AC energy consumption rates and normalized driving features of the EV in all test sub-cycles. The DC energy consumption indicator includes: a DC energy consumption base, a DC energy consumption speed sensitivity, a DC energy consumption braking sensitivity and a DC energy consumption slow-driving sensitivity. The AC energy consumption indicator includes: an AC energy consumption base, an AC energy consumption speed sensitivity, an AC energy consumption braking sensitivity and an AC energy consumption slow-driving sensitivity.

The energy consumption rate determination module 303 specifically includes: a test distance determination unit, a DC energy consumption rate determination unit, and an AC energy consumption rate determination unit.

The test distance determination unit is configured to determine a test distance of the EV in a jth test sub-cycle according to an equation $d_j = \sum_{i=1}^{N_j-1} t_s (v_j(i) + v_j(i+1))/2$.

The DC energy consumption rate determination unit is configured to determine a DC energy consumption rate of the EV in the jth test sub-cycle according to an equation $c_{DC,j}=E_{DC,j}/d_j$.

The AC energy consumption rate determination unit is configured to determine an AC energy consumption rate of the EV in the jth test sub-cycle according to an equation $$c_{AC,j} = \frac{E_{AC}}{\sum_{j=1}^{N} E_{DC,j}} c_{DC,j}.$$

In the foregoing equations, $d_j$ is the test distance of the EV in the jth test sub-cycle, $N_j$ is a total number of samples in the jth test sub-cycle, $v_j(i)$ is a driving speed sequence of the EV in the jth test sub-cycle, $i=1 \ldots N_j$, $t_s$ is a sampling interval, $C_{DC,j}$ is the DC energy consumption rate of the EV in the jth test sub-cycle, $E_{DC,j}$ is a DC energy consumption of the EV in the jth test sub-cycle, $E_{AC}$ is a total AC energy consumption in the test cycle, and $C_{AC,j}$ is the AC energy consumption rate of the EV in the jth test sub-cycle.

The driving feature determination module 304 specifically includes: a speed intensity determination unit, a braking intensity determination unit, and a slow-driving intensity determination unit.

The speed intensity determination unit is configured to determine a speed intensity in the jth test sub-cycle according to an equation $$I_{spd,j} = \frac{\sum_{i=1}^{N_j} (v_j(i))^3}{\sum_{i=1}^{N_j} v_j(i)}.$$

The braking intensity determination unit is configured to determine a braking intensity in the jth test sub-cycle according to an equation $$I_{brk,j} = \frac{\sum_{i=1}^{N_j} \max((v_j(i))^2 - (v_j(i+1))^2, 0)}{\sum_{i=1}^{N_j} v_j(i)}.$$

The slow-driving intensity determination unit is configured to determine a slow-driving intensity in the jth test sub-cycle according to an equation $$I_{slw,j} = \frac{1}{\sum_{i=1}^{N_j} v_j(i)}.$$

In the foregoing equations, $I_{spd,j}$ is the speed intensity in the jth test sub-cycle, $I_{brk,j}$ is the braking intensity in the jth test sub-cycle, and $I_{slw,j}$ is the slow-driving intensity in the jth test sub-cycle.

The normalized driving feature determination module 305 specifically includes: a normalized speed intensity determination unit, a normalized braking intensity determination unit, and a normalized slow-driving intensity determination unit.

The normalized speed intensity determination unit is configured to determine a normalized speed intensity according to an equation $$I'_{spd} = \frac{I_{spd}}{I_{spd}^{base}}.$$

The normalized braking intensity determination unit is configured to determine a normalized braking intensity according to an equation $$I'_{brk} = \frac{I_{brk}}{I_{brk}^{base}}.$$

The normalized slow-driving intensity determination unit is configured to determine a normalized slow-driving intensity according to an equation $$I'_{slw} = \frac{I_{slw}}{I_{slw}^{base}}.$$

In the foregoing equations, $I_{spd}^{base}$ is a base speed intensity, $I_{brk}^{base}$ is a base braking intensity, and $I_{slw}^{base}$ is a base slow-driving intensity.

The energy consumption indicator extraction module 306 specifically includes: a DC energy consumption indicator extraction unit, and an AC energy consumption indicator extraction unit.

The DC energy consumption indicator extraction unit is configured to extract the DC energy consumption indicator of the EV according to an equation $c_{DC,j}=c_{DC}^{0}+c_{DC}^{spd}I'_{spd,j}+c_{DC}^{brk}I'_{brk,j}+c_{DC}^{slw}I'_{slw,j}$ by using a fitting method.

The AC energy consumption indicator extraction unit is configured to extract the AC energy consumption indicator of the EV according to an equation $c_{AC,j}=c_{AC}^{0}+c_{AC}^{spd}I'_{spd,j}+c_{AC}^{brk}I'_{brk,j}+c_{AC}^{slw}I'_{slw,j}$ by using the fitting method.

In the foregoing equations, $c_{DC}^{0}$ is the DC energy consumption base, $c_{DC}^{spd}$ is the DC energy consumption speed sensitivity, $c_{DC}^{brk}$ is the DC energy consumption braking sensitivity, $c_{DC}^{slw}$ is the DC energy consumption slow-driving sensitivity, $c_{AC}^{0}$ is the AC energy consumption base, $c_{AC}^{spd}$ is the AC energy consumption speed sensitivity, $c_{AC}^{brk}$ is the AC energy consumption braking sensitivity, $c_{AC}^{slw}$ is the AC energy consumption slow-driving sensitivity, $I'_{spd,j}$ is a normalized speed intensity in the jth test sub-cycle, $I'_{brk,j}$ is a normalized braking intensity in the jth test sub-cycle, and $I'_{slw,j}$ is a normalized slow-driving intensity in the jth test sub-cycle.

Each embodiment in the specification is described in a progressive manner, each embodiment focuses on the difference from other embodiments, and the same and similar parts between the embodiments may refer to each other. For the system disclosed in the embodiments, since the system corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A method for characterizing an energy consumption indicator of an electric vehicle (EV), comprising:
generating a test cycle, multiple test sub-cycles being assigned to different state of charge (SOC) phases of the test cycle;
performing a cyclic energy consumption test on the EV according to the generated test cycle until a termination condition for the energy consumption test of the EV is met, and acquiring a time-speed curve, a time-direct current (DC) energy consumption curve, and a total alternating current (AC) energy consumption in the test cycle during the test;
determining a DC energy consumption rate and an AC energy consumption rate of the EV in each of the test sub-cycles according to a result of the cyclic energy consumption test;
determining a driving feature in each of the test sub-cycles according to the time-speed curve in the test cycle, the driving feature including a speed intensity, a braking intensity and a slow-driving intensity;
determining a normalized driving feature in each of the test sub-cycles according to the driving feature in each of the test sub-cycles and a base driving feature, the base driving feature being a driving feature in a base cycle; and
extracting a DC energy consumption indicator and an AC energy consumption indicator of the EV according to DC energy consumption rates, AC energy consumption rates and normalized driving features of the EV in all test sub-cycles, the DC energy consumption indicator including a DC energy consumption base, a DC energy consumption speed sensitivity, a DC energy consumption braking sensitivity and a DC energy consumption slow-driving sensitivity; and the AC energy consumption indicator including an AC energy consumption base, an AC energy consumption speed sensitivity, an AC energy consumption braking sensitivity and an AC energy consumption slow-driving sensitivity.

2. The method for characterizing an energy consumption indicator of an EV according to claim 1, wherein the determining a DC energy consumption rate and an AC energy consumption rate of the EV in each of the test sub-cycles according to a result of the cyclic energy consumption test comprises:
determining a test distance of the EV in a jth test sub-cycle according to an equation $d_j = \sum_{i=1}^{N_j-1} t_s(v_j(i)+v_j(i+1))/2$;
determining a DC energy consumption rate of the EV in the jth test sub-cycle according to an equation $c_{DC,j} = E_{DC,j}/d_j$; and
determining an AC energy consumption rate of the EV in the jth test sub-cycle according to an equation $$c_{AC,j} = \frac{E_{AC}}{\sum_{j=1}^{N} E_{DC,j}} c_{DC,j},$$

wherein, $d_j$ is the test distance of the EV in the jth test sub-cycle, $N_j$ is a total number of samples in the jth test sub-cycle, $v_j(i)$ is a driving speed sequence of the EV in the jth test sub-cycle, $i=1 \ldots N_j$, $t_s$ is a sampling interval, $C_{DC,j}$ is the DC energy consumption rate of the EV in the jth test sub-cycle, $E_{DC,j}$ is a DC energy consumption of the EV in the jth test sub-cycle, $E_{AC}$ is a total AC energy consumption in the test cycle, $C_{AC,j}$ is the AC energy consumption rate of the EV in the jth test sub-cycle, and N is a number of the multiple test sub-cycles.

3. The method for characterizing an energy consumption indicator of an EV according to claim 2, wherein the determining a driving feature in each of the test sub-cycles according to the time-speed curve in the test cycle comprises:
determining a speed intensity in the jth test sub-cycle according to an equation $$I_{spd,j} = \frac{\sum_{i=1}^{N_j} (v_j(i))^3}{\sum_{i=1}^{N_j} v_j(i)};$$

determining a braking intensity in the jth test sub-cycle according to an equation $$I_{brk,j} = \frac{\sum_{i=1}^{N_j} \max((v_j(i))^2 - (v_j(i+1))^2, 0)}{\sum_{i=1}^{N_j} v_j(i)};$$

and determining a slow-driving intensity in the jth test sub-cycle according to an equation $$I_{slw,j} = \frac{1}{\sum_{i=1}^{N_j} v_j(i)},$$

wherein, $I_{spd,j}$ is the speed intensity in the jth test sub-cycle, $I_{brk,j}$ is the braking intensity in the jth test sub-cycle, and $I_{slw,j}$ is the slow-driving intensity in the jth test sub-cycle.

4. The method for characterizing an energy consumption indicator of an EV according to claim 3, wherein the determining a normalized driving feature in each of the test sub-cycles according to the driving feature in each of the test sub-cycles and a base driving feature comprises:
determining a normalized speed intensity according to an equation $$I'_{spd} = \frac{I_{spd}}{I_{spd}^{base}};$$

determining a normalized braking intensity according to an equation $$I'_{brk} = \frac{I_{brk}}{I_{brk}^{base}};$$

and
determining a normalized slow-driving intensity according to an equation $$I'_{slw} = \frac{I_{slw}}{I_{slw}^{base}},$$

wherein, $I_{spd}^{base}$ is a base speed intensity, $I_{brk}^{base}$ is a base braking intensity, $I_{slow}^{base}$ is a base slow-driving intensity, $I'_{spd}$ is the normalized speed intensity, $I'_{brk}$ is the normalized braking intensity, $I'_{slw}$ is the normalized slow-driving intensity, $I_{spd}$ is the speed intensity, $I_{brk}$ is the braking intensity, and $I_{slw}$ is the slow-driving intensity.

5. The method for characterizing an energy consumption indicator of an EV according to claim 4, wherein the extracting a DC energy consumption indicator and an AC energy consumption indicator of the EV according to DC energy consumption rates, AC energy consumption rates and normalized driving features of the EV in all test sub-cycles comprises:

extracting the DC energy consumption indicator of the EV according to an equation $c_{DC,j}=c_{DC}^0+c_{DC}^{spd}I'_{spd,j}+c_{DC}^{brk}I'_{brk,j}+c_{DC}^{slw}I'_{slw,j}$ by using a fitting method; and extracting the AC energy consumption indicator of the EV according to an equation $c_{AC,j}=c_{AC}^0+c_{AC}^{spd}I'_{spd,j}+c_{AC}^{brk}I'_{brk,j}+c_{AC}^{slw}I'_{slw,j}$ by using the fitting method, wherein, $c_{DC}^0$ is the DC energy consumption base, $c_{DC}^{spd}$ is the DC energy consumption speed sensitivity, $c_{DC}^{brk}$ is the DC energy consumption braking sensitivity, $c_{DC}^{slw}$ is the DC energy consumption slow-driving sensitivity, $c_{AC}^0$ is the AC energy consumption base, $c_{AC}^{spd}$ is the AC energy consumption speed sensitivity, $c_{AC}^{brk}$ is the AC energy consumption braking sensitivity, $c_{AC}^{slw}$ is the AC energy consumption slow-driving sensitivity, $I'_{spd,j}$ is a normalized speed intensity of the EV in the jth test sub-cycle, $I'_{brk,j}$ is a normalized braking intensity in the jth test sub-cycle, and $I'_{slw,j}$ is a normalized slow-driving intensity in the jth test sub-cycle.

6. The method for characterizing an energy consumption indicator of an EV according to claim 5, wherein the extracting a DC energy consumption indicator and an AC energy consumption indicator of the EV according to DC energy consumption rates, AC energy consumption rates and normalized driving features of the EV in all test sub-cycles specifically further comprises:

adding a constraint according to equations $c_{DC}^{base}=c_{DC}^0+c_{DC}^{spd}+c_{DC}^{brk}+c_{DC}^{slw}$ and $c_{AC}^{base}=c_{AC}^0+c_{AC}^{spd}+c_{AC}^{brk}+c_{AC}^{slw}$, wherein, $c_{DC}^{base}$ is a DC energy consumption rate in the base cycle, and $c_{AC}^{base}$ is an AC energy consumption rate in the base cycle.

* * * * *